United States Patent [19]

Loll

[11] Patent Number: 5,279,108
[45] Date of Patent: Jan. 18, 1994

[54] SYSTEM FOR REDUCTION OF $NO_x$ IN JET ENGINE EXHAUST

[75] Inventor: Tony J. Loll, Costa Mesa, Calif.

[73] Assignee: Union Oil Company of California, Los Angeles, Calif.

[21] Appl. No.: 843,814

[22] Filed: Feb. 28, 1992

[51] Int. Cl.⁵ .............................................. F02C 7/00
[52] U.S. Cl. .................................. 60/39.5; 244/53 R; 423/235
[58] Field of Search ................. 60/39.5; 423/235, 239; 244/53R

[56] References Cited

U.S. PATENT DOCUMENTS

| | | | |
|---|---|---|---|
| 4,131,432 | 12/1978 | Sato et al. | 60/39.5 |
| 4,325,924 | 4/1982 | Arand et al. | 423/235 |
| 4,423,017 | 12/1983 | Dean | 423/235 |
| 4,636,370 | 1/1987 | Dean et al. | 423/235 |
| 4,851,201 | 7/1989 | Heap et al. | 423/235 |
| 5,161,366 | 11/1992 | Beebe | 60/39.5 |

*Primary Examiner*—Louis J. Casaregola
*Attorney, Agent, or Firm*—Gregory F. Wirzbicki; Charles L. Hartman

[57] ABSTRACT

A mixture of urea, ammonia, and water is injected into the exhaust of jet engines to lower the amount of $NO_x$ emitted from jet engines.

7 Claims, No Drawings

SYSTEM FOR REDUCTION OF NO$_x$ IN JET ENGINE EXHAUST

FIELD OF THE INVENTION

This invention relates to methods of lowering the amount of oxides of nitrogen produced in the exhaust gases of jet engines.

STATE OF THE ART

Concern has been raised about the pollution caused by jet engine exhaust. Jet engines burn hydrocarbon fuels in air. While the high velocity exhaust produces the desired thrust, the exhaust also contains oxides of nitrogen. Oxides of nitrogen (also referred to as NO$_x$) are recognized contributors to air pollution. It is normally conceded that jet engines produce only a small portion of the total amount of nitrogen oxides in the air. However, the amount produced by jet engines is especially significant since most of the NO$_x$ emissions produced by jet engines are emitted at high altitudes above the tropopause, the boundary between the troposphere and the stratosphere. Oxides of nitrogen emitted above the tropopause tend to be particularly destructive to the upper layers of the atmosphere, including the ozone layer.

The impact of emitted NO$_x$ on the upper layers of the atmosphere will be increasingly severe as the number of high flying jet aircraft increases. The number of aircraft that may safely use the upper layers of the atmosphere may be exceeded by the increased aircraft traffic. This may happen soon, if high flying supersonic aircraft designs are further developed. Therefore, a method to lower the amount of nitrogen oxides emitted at high altitude would be of great benefit.

No method of NO$_x$ abatement currently used or suggested is entirely satisfactory to reduce NO$_x$ emitted from jet engines. One suggested method of lowering NO$_x$ is to redesign the jet engine. Jet engine manufacturers hope to achieve such clean combustion that the engine no longer produces NO$_x$. But such redesigns have yet to prove themselves and may result in extremely temperamental engines. Another method is to reformulate the fuel used in jet engines. But the jet fuels have already been reformulated to eliminate most aromatic components. What further reformulation could be economically done is not clear. Methods of lowering NO$_x$ emissions that are useful for ground transportation, catalytic converters and the like, are impractical with jet engines.

SUMMARY OF THE INVENTION

A mixture of urea, ammonia, and water is injected into the exhaust of jet engines to lower the weight rate of NO$_x$ emitted from jet engines. The mixture reacts with the NO$_x$ to yield environmentally safe molecular nitrogen. This mixture is useful for reducing the emission of NO$_x$ at all altitudes and operating conditions. In a preferred embodiment the amount of NO$_x$ emitted above the troposphere is reduced than would otherwise be the case for the same number of aircraft.

DETAILED DESCRIPTION OF THE INVENTION

Jet engines use the power generated by burning a fuel in air to produce thrust. The thrust is usually used directly to propel an aircraft. The thrust may alternatively be used to provide power to a rotary member.

Jet engines come in a variety of forms. Ramjets are the structurally simplest jet engines. They are essentially hollow tubes that admit air at one end, add fuel to burn in the air, and exhaust the hot gases produced out the other end. The most common form of jet engine is the turbine jet. The turbine member includes both a rotary compressor and a turbine mounted on a shaft. The shaft is rotatably mounted in a tube-like body. The compressor stage compresses the incoming air used to support combustion of a fuel. The resulting hot gases then move past, and rotate, the turbine before being exhausted into the atmosphere. Turbojets, turbofans, turboprops, and the like will herein all be considered to be types of turbine jets. Afterburners are frequently mounted after turbine jets to achieve supersonic speeds. An afterburner can be thought of as a type of ramjet that uses the exhaust of a turbine as its air source. Finally, there are exotic forms of jets less frequently encountered, but still within the scope of this invention and the appended claims. Pulsejets are one form of exotic jet engine.

The total amount of NO$_x$ emitted by a given jet engine combusting a given amount of fuel can be lowered by injecting a mixture of urea, ammonia, and water into the exhaust of the jet engine. The mixture of urea, ammonia, and water is effective for lowering the weight rate at which NO$_x$ is emitted over a wide temperature and residence time range. The reason for this effectiveness is not clear. However, although urea is a source of ammonia through decomposition, it appears that urea may also act as a catalyst for a reaction between NO$_x$ and ammonia. It is known that urea can be hydrolyzed at elevated temperatures to form ammonia and water. However, urea, in the presence of an initial concentration of ammonia, produces more ammonia than when urea is the only component present initially. Therefore, an interaction between urea and ammonia is believed responsible for the increased ammonia production, accounting for the effectiveness observed. However, the invention is not to be bound by this or any other theory of of operation.

Both ammonia and urea are individually difficult to handle. Ammonia, especially anhydrous ammonia, presents dangers to its users. It is corrosive and, when liquid, cold enough ($-33°$ C., $-27°$ F.) to require special handling. It has the major drawback of producing an ammonia cloud upon spilling that doesn't readily dissipate. This cloud is deadly to all life, plant and animal, that happen to be enveloped by it. Consequently, an accidental spill of ammonia is very serious. Urea is a solid and thus presents the handling problems associated with powdery solids. Powdery solids are so difficult to handle that their use is precluded on aircraft.

Mixtures of ammonia, urea, and water are, in general, liquid compositions that can easily be handled and give good results. These compositions can be used to yield high rates of conversion of nitrogen oxides to nitrogen and water. One does not have to face any of the problems involved in the handling of anhydrous ammonia or solid urea.

It is believed that ammonia is the active reducing agent in the process of the invention. In the mixtures of ammonia, urea, and water of this invention, urea is a precursor to ammonia. NO$_x$, which consists essentially of NO and NO$_2$, is converted to nitrogen and water in accordance with the following overall reactions:

$$8NH_3 + 6NO_2 \rightarrow 7N_2 + 12H_2O \quad \text{(RXN 1)}$$

$$4NH_3 + 6NO \rightarrow 5N_2 + 6H_2O \quad \text{(RXN 2)}$$

Urea is hydrolyzed to ammonia at elevated temperatures in accordance with the following equation:

$$H_2N-\overset{\overset{O}{\|}}{C}-NH_2 + H_2O \longrightarrow 2NH_3 + CO_2 \quad \text{(RXN 3)}$$

Therefore, one can think of the mixture of ammonia, urea, and water useful in this invention as an ammonia source. The added convenience of use allows ammonia reduction of $NO_x$ in aircraft that don't have the capacity to carry the extra weight of the cryogenic equipment, and associated hardware, that would be involved with the safe inflight handling of ammonia.

In general, any mixture of urea, ammonia and water can be used in the practice of the present invention. For example, molar ratios of urea to ammonia of about 1:5 to about 5:1, preferably about 1:2 to about 2:1, can be used. Preferred compositions have total nitrogen contents between about 25 and 50 weight percent, preferably between about 30 and 37 weight percent, and most preferably between about 32 and 35 weight percent. Preferred compositions include between 20 and 40 wt % urea, 10 and 40 wt % ammonia, and 20 and 70 wt % water. More importantly, the compositions useful in the present invention preferably have ammonia equivalents in the range of 30 to 60 wt %. A first such mixture of ammonia, urea, and water particularly useful in the process of the present invention contains about 30 wt % urea, about 23 wt % ammonia, and about 47 wt % water. It is preferred because it has a relatively high ammonia equivalent of 39 wt % and can be handled safely. A second composition is a mixture containing about 33 wt % urea, about 37 wt % ammonia, and about 30 wt % water. This alternative, however, is less attractive than the first composition because, although providing an ammonia equivalent of 55 wt % percent, it presents handling problems, since it boils at room temperature.

Mixtures of ammonia, urea, and water may have a high total nitrogen content and high boiling point. However, some of these compositions have been found to have unexpectedly low temperatures of crystallization. Specifically, a A detailed discussion of this unexpectedly low crystallization temperature can be found in U.S. Pat. No. 4,508,558 issued to Young, which Patent is hereby incorporated in full. This can be advantageous inflight because the ambient temperature is so cold at altitudes above the tropopause.

Typically, the weight rate of $NO_x$ produced by a given jet engine will be known. Based on RXNs 1 to 3 the stoichiometric rate or ratio of the mixture of ammonia, urea, and water for the amount of $NO_x$ in the exhaust can be calculated. The mixture will be injected into the jet engine exhaust at between 50% and 200%, preferably between 75% and 150% of the stoichiometric rate. Typically, it has been found that engines produce $NO_x$ at a rate requiring about a one-to-one rate of the preferred compositions previously defined for the additive. In other words, for a hypothetical "normal" jet engine operating under "normal" operating conditions, about one kilogram of mixture can be added for every kilogram of $NO_x$ produced in the engine's exhaust. If, in the hypothetical given, the jet engine produces one kilogram of $NO_x$ per hour, then one kilogram of mixture can be added per hour of engine time. Other jet engines operating under different conditions may require more or less of the mixture. Calculation of the amount for any jet engine is well within the skill of the art, once the rate at which $NO_x$ is produced by the engine is known.

Jet engines are designed to have extremely efficient combustion chambers. The engines burn fuel at about the temperature normal for a stoichiometric mixture of air and hydrocarbon fuel, which is about 1100° F. to 2000° F., usually between 1200° F. to 1800° F. The mixture of ammonia, urea, and water is preferably injected by an injection means into the jet engine exhaust at a point where the exhaust temperature is greater than 1000° F. This will generally be at some point behind the combustion chamber, or optionally between a combustion chamber and any afterburners present. However, it is generally desired that a composition not be allowed either into a combustion chamber or afterburner, to avoid oxidizing the urea and ammonia to $NO_x$. In the case of a turbine jet engine, the mixture is preferably added aft of the turbine to avoid contacting the turbine with particulate matter.

The injection means useful in the operation of the invention may be used continuously in the turbine jet portion of the jet engine. It will usually comprise a tank to hold a quantity of the ammonia, urea, and water mixture, a pump, piping from the tank to a point near the engine exhaust stream, and at least one nozzle for directing the liquid mixture into the exhaust stream. The injection means will be adjustable to provide maximum $NO_x$ abatement as the engine throttle settings are varied.

Afterburners are widely used in military aircraft, but are currently uncommon in commercial aircraft. Military aircraft use the afterburners intermittently, usually to enable supersonic sprints. In one embodiment of this invention, an injection means can be used intermittently for use in aircraft with intermittent need for afterburners. Such engines require only an intermittent need for abatement of $NO_x$ produced by an afterburner. Many supersonic commercial aircraft now being developed are expected to use their afterburners constantly during routine flight. Therefore, in a second embodiment of this invention, the afterburner injection means contemplated for commercial aircraft will operate throughout the flight.

The mixture of ammonia, urea, and water added to the exhaust lowers the $NO_x$ emitted by the engine to low levels. Assume, for example, use of this invention lowers the level of $NO_x$ to half what it is without treatment. Two aircraft using this invention can replace one aircraft not using this invention without increasing the amount of $NO_x$ put into the atmosphere. Therefore, more aircraft can use the fragile upper atmosphere without damaging it further. A benefit of this is that more aircraft can fly in the upper atmosphere while producing the same or lower environmentally harmful amount of $NO_x$.

More particularly, one embodiment of the invention provides a method for increasing the environmentally safe carrying capacity of the earth's atmosphere for aircraft traffic at altitudes higher than the tropopause. At least one aircraft having means for injecting a a mixture of ammonia, urea, and water into an exhaust stream of the aircraft is flown higher than the tropopause. The mixture is injected into the engine exhaust while the aircraft is above the tropopause. This lowers the amount of nitrogen oxides placed into the atmosphere per aircraft flying at high altitudes. The operation of many aircraft injecting the mixture of ammonia, urea, and water results in a substantial lowering of $NO_x$.

Although this invention has been primarily described in conjunction with references to the preferred embodiments thereof, it is evident that many alternatives, modifications and variations will be apparent to those skilled in the art in light of the foregoing description. Accordingly, it is intended that the spirit and scope of the appended claims embrace all such alternatives, modifications and variations.

What is claimed is:

1. A jet aircraft powered by at least one jet engine, comprising:
    a tank for holding a mixture, said tank containing a mixture consisting essentially of between 10 and 40 wt % ammonia, 20 and 40 wt % urea, and 20 and 70 wt % water on board the jet aircraft; and
    means for injecting the mixture into the exhaust gases of each jet engine powering the aircraft, said means for injecting in fluid communication with the tank.

2. The jet aircraft of claim 1 wherein the engine comprises a jet turbine engine including a rotary compressor driven by a gas turbine.

3. The jet aircraft of claim 2 wherein at least one injection nozzle, in fluid communication with the tank, is located to inject the mixture into the exhaust gases.

4. The jet aircraft of claim 3 wherein the injection nozzle is located to inject the mixture into a location in the exhaust of the jet engine where the temperature would be between 1100° F. and 1300° F. in normal operation of the jet engine.

5. A jet aircraft powered by at least one jet engine comprising a rotary compressor driven by a gas turbine, comprising:
    a tank, containing a mixture of between 10 and 40 wt % ammonia, 20 and 40 wt % urea, and 20 and 70 wt % water, mounted on the jet aircraft; and
    at least one injection nozzle, in fluid communication with the tank, located to inject the mixture into the exhaust gases.

6. A jet aircraft powered by at least one jet engine comprising a rotary compressor driven by a gas turbine, comprising:
    a tank, containing a mixture of between 10 and 40 wt % ammonia, 20 and 40 wt % urea, and 20 and 70 wt % water, mounted on the jet aircraft; and
    at least one injection nozzle, in fluid communication with the tank, located to inject the mixture into the exhaust gases wherein the injection nozzle is located to inject the mixture in the exhaust of the jet engine where the temperature would be between 1100° F. and 1300° F. in normal operation of the jet engine.

7. A jet aircraft powered by at least one jet engine, comprising:
    a tank containing a mixture consisting essentially of about 23 wt % ammonia, about 30 wt % urea, and about 47 wt % water on aboard the jet aircraft; and
    means for injecting the mixture into the exhaust gases of each jet engine powering the aircraft, said means for injecting in fluid communication with the tank.

* * * * *

UNITED STATES PATENT AND TRADEMARK OFFICE
CERTIFICATE OF CORRECTION

PATENT NO.   : 5,279,108
DATED        : January 18, 1994
INVENTOR(S)  : Tony J. Loll It is certified that error appears in the above-identified patent and that said Letters Patent is hereby corrected as shown below:

Column 6, claim 7, line 29, replace "aboard" with -- board --.

Signed and Sealed this

Thirty-first Day of May, 1994

Attest:

BRUCE LEHMAN

*Attesting Officer*     *Commissioner of Patents and Trademarks*